United States Patent
Gussmann et al.

(10) Patent No.: US 8,833,237 B2
(45) Date of Patent: Sep. 16, 2014

(54) COFFEE MACHINE

(75) Inventors: Jochen Gussmann, Schwaebisch Gmuend (DE); Tobias Krips, Ulm (DE); Ludwig Weinberger, Blaustein (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 329 days.

(21) Appl. No.: 12/021,048

(22) Filed: Jan. 28, 2008

(65) Prior Publication Data
US 2008/0190297 A1 Aug. 14, 2008

(30) Foreign Application Priority Data
Feb. 8, 2007 (EP) ..................................... 07002755

(51) Int. Cl.
*A47J 31/40* (2006.01)
*A47J 31/42* (2006.01)

(52) U.S. Cl.
CPC .............. *A47J 31/404* (2013.01); *A47J 31/42* (2013.01)
USPC ................ 99/280; 99/286; 99/289 R; 99/297; 99/300; 99/329 R; 99/329 P

(58) Field of Classification Search
CPC ......... A47J 42/44; A47J 31/404; A47J 31/42; A23F 5/24
USPC ...... 99/280, 283, 289 R, 286, 297, 300, 32 R, 99/32 P
See application file for complete search history.

(56) References Cited

U.S. PATENT DOCUMENTS

| 360,212 | A | * | 3/1887 | Cherre ............................. 206/49 |
| 3,596,588 | A | * | 8/1971 | Moss ................................ 99/282 |
| 3,739,709 | A | * | 6/1973 | Herbsthofer et al. ....... 99/289 R |
| 3,988,974 | A | * | 11/1976 | Kaplan ............................ 99/285 |
| 4,007,675 | A | * | 2/1977 | Cailliot et al. .................. 99/286 |
| 4,109,565 | A | * | 8/1978 | Tucker ............................. 99/283 |
| 4,406,217 | A | * | 9/1983 | Oota ............................... 99/280 |
| 4,468,406 | A | * | 8/1984 | d'Alayer de Costemore d'Arc ............................ 426/231 |
| 4,608,916 | A | * | 9/1986 | Becker et al. ................... 99/283 |
| 4,659,023 | A | * | 4/1987 | Frei et al. ......................... 241/30 |
| 4,706,555 | A | * | 11/1987 | Nakamura et al. ............... 99/283 |
| 4,738,378 | A | * | 4/1988 | Oakley et al. ................... 222/82 |

(Continued)

FOREIGN PATENT DOCUMENTS

| DE | 36 15 158 C1 | 7/1987 |
| EP | 1955624 A1 | 8/2008 |
| JP | 2011167354 A | 6/2001 |

OTHER PUBLICATIONS

Partial European Search Report for European Application No. EP 07 00 2755; Date of Mailing: Jun. 28, 2007; pp. 2.

(Continued)

*Primary Examiner* — Dana Ross
*Assistant Examiner* — Brett Spurlock
(74) *Attorney, Agent, or Firm* — Marshall, Gerstein & Borun LLP

(57) ABSTRACT

A coffee machine (1) having a coffee grinding device (9), a brewing device (5), a brewing water source (7) and a flowmeter (8), which for the user offers a particularly simple setting of the extract content of a coffee beverage. A display device (16) is provided for displaying the flow rate acquired on the flowmeter (8).

3 Claims, 3 Drawing Sheets

(56) References Cited

U.S. PATENT DOCUMENTS

| | | | |
|---|---|---|---|
| 4,762,055 A * | 8/1988 | Shimomura | 99/285 |
| 4,767,632 A | 8/1988 | Meier | |
| 5,115,730 A * | 5/1992 | Gockelmann | 99/280 |
| 5,186,399 A * | 2/1993 | Knepler et al. | 241/34 |
| 5,193,438 A * | 3/1993 | Courtois | 99/286 |
| 5,312,637 A * | 5/1994 | Midden | 426/433 |
| 5,357,848 A * | 10/1994 | Eugster et al. | 99/279 |
| 5,417,145 A * | 5/1995 | Joseph et al. | 99/280 |
| 5,598,764 A * | 2/1997 | Bambi | 99/295 |
| 5,660,336 A * | 8/1997 | Joseph et al. | 241/27 |
| 5,662,955 A * | 9/1997 | Joseph et al. | 426/432 |
| 5,676,041 A * | 10/1997 | Glucksman et al. | 99/286 |
| 5,718,163 A * | 2/1998 | Termini | 99/286 |
| 5,738,001 A * | 4/1998 | Liverani | 99/283 |
| 5,823,096 A * | 10/1998 | Shih | 99/302 P |
| 6,099,878 A * | 8/2000 | Arksey | 426/231 |
| 6,148,717 A * | 11/2000 | Lassota | 99/283 |
| 6,415,707 B1 * | 7/2002 | Armstrong | 99/280 |
| 6,550,648 B2 * | 4/2003 | Bardin | 222/129.3 |
| 6,579,563 B1 * | 6/2003 | Dillon | 427/8 |
| 6,626,085 B1 * | 9/2003 | Lassota | 99/286 |
| 6,700,340 B2 * | 3/2004 | Wong et al. | 318/364 |
| 6,762,975 B2 * | 7/2004 | Wu | 368/10 |
| 6,783,089 B2 * | 8/2004 | Lassota | 241/30 |
| 6,857,354 B2 * | 2/2005 | Reyhanloo | 99/289 R |
| 6,904,840 B1 * | 6/2005 | Pfeifer et al. | 99/295 |
| 7,134,384 B1 * | 11/2006 | Otterberg | 99/280 |
| 7,223,427 B2 * | 5/2007 | Knepler | 426/231 |
| 7,581,488 B2 * | 9/2009 | Caswell | 99/290 |
| 2003/0003208 A1 * | 1/2003 | Lassota | 426/433 |
| 2003/0129286 A1 * | 7/2003 | Knepler | 426/231 |
| 2003/0167928 A1 * | 9/2003 | Mulle et al. | 99/279 |
| 2004/0025703 A1 * | 2/2004 | Ming | 99/286 |
| 2004/0060449 A1 * | 4/2004 | Reyhanloo | 99/279 |
| 2004/0123747 A1 * | 7/2004 | Lassota | 99/510 |
| 2006/0201339 A1 * | 9/2006 | Vetterli | 99/452 |
| 2006/0254428 A1 * | 11/2006 | Glucksman et al. | 99/302 P |

OTHER PUBLICATIONS

Written Opinion of the International Search Authority (Added Sheet); International Application No. PCT/EP2006/006648; Filing Date: Jul. 7, 2006.

* cited by examiner

COFFEE MACHINE

CROSS-REFERENCE TO RELATED APPLICATION

The present application claims the benefit of priority of European Patent Application No. EP 07002755.2, filed on Feb. 8, 2007. The entire text of the priority application is incorporated herein by reference in its entirety.

FIELD OF THE DISCLOSURE

The disclosure relates to a coffee machine.

BACKGROUND

A large number of coffee machines with an integrated coffee grinding device or which have said device as a supplementary built-on unit as well as an essentially automatic hot-water feed to the brewing device are known. One of these coffee machines is for example described in DE 3615158C1. With the known coffee machine coffee powder is fed through the actuation of a grinder into a brewing chamber, the brewing chamber is closed by a displaceable piston until a specified contact pressure of the piston on the coffee powder cake is reached and then the brewing water is passed through. If it is found after repeated preparation cycles that too little or too much coffee powder has been fed into the brewing chamber, the grinding time of the grinder is automatically shortened or lengthened under the action of a programmable control device. Simultaneously or in addition to this, a flow measuring element measures the amount of the fed brewing water and the control device measures the time required for it. If this time period deviates in a positive or negative sense from a specified set time period, a readjustment is made after a few preparation cycles in that the grinding grade carried out by the grinder is automatically set to "finer" or "coarser". Smaller deviations within normal tolerances are not considered here in both cases.

The known coffee machine is formed as a fully automatic machine which is intended to simplify the user's activities associated with the preparation of various types of coffee. In principle the customer only needs to actuate a certain program key to obtain a desired coffee beverage. The control of the machine occurs according to factory-set programmed parameters which are designed for an optimum result for each certain type of beverage. These parameters are determined in advance through tasting and operational tests. These parameters may for example comprise the amount of fed coffee grounds, the grinding grade of the grounds, the contact pressure of the piston for piston-type brewers, the amount of water and the dispensing time. The maintenance of these parameters for each brewing process is monitored automatically and, with larger deviations, automatically corrected, without the user having to intervene.

Thus, it is also intended that the grinding grade of the grinder is modified automatically when the preparation time of a beverage deviates from an associated set value.

The grinding grade of the grounds brewed makes a decisive contribution to the coffee quality. If the grinding grade is too fine, then this can lead to the brewing process taking an unreasonable length of time or it even cancels, because the brewer is blocked. If it is too coarse, the brewing water passes through the grounds too quickly, producing a negative effect on the taste of the coffee. In particular, for the preparation of a good espresso a minimum contact time of the brewing water with the coffee is required. Also finely ground grounds offer more contact area with the brewing water, leading to better extraction and more aroma. In addition, for the development of the taste and the formation of a desirable creamy layer on the espresso it is necessary that the pressed grounds layer offers adequate resistance to the pump in order to establish a brewing pressure of between 6 and 9 bar. With a fine grinding grade this has a decisive favorable effect.

A factory setting to an "optimum" grinding grade is also not practicable, because with a defined setting for the grinding grade the grinding result can turn out to be very different due to the varying consistency of the sorts of beans used. Even with one and the same sort of bean the fineness of the ground coffee can significantly differ due to different degrees of roasting.

An automatic controlling device, as with the known coffee machine, is however, for example for household machines, too expensive, because a dedicated drive is required to adjust the grinding grade. Additionally, complex algorithms need to be saved in the controller which prevent a closed-loop control behavior that is too sensitive. Also the method for the measurement of the preparation time is not always suitable, because the different amounts prepared of different coffee beverages are not taken into account or a dedicated set value must be saved for each prepared amount.

SUMMARY OF THE DISCLOSURE

The object of the disclosure is therefore to provide a coffee machine which offers the customer a simple and economical option of setting the grinding grade of the grinder in a coffee machine as finely as possible to the coffee beans being used without the risk of the brewing device becoming blocked.

According to the disclosure it has been found that the flow rate to the brewing device of the water used for brewing represents a meaningful measure of the desired coffee quality (extract content, taste). The flow rate is a measure of the speed of flow of the brewing water through the grounds and the brewing pressure which builds up over the grounds. Therefore, a conclusion can be drawn on the fineness of the grounds. Along with the amount of grounds, the fineness of the grounds is the parameter which most significantly influences the coffee quality.

The flowmeter is preferably arranged between the brewing water source and the brewing device, which is also the case with coffee machines which are not equipped according to the disclosure, so that no further constructive modifications to the coffee machine are necessary.

The dependence of the flow rate on the aroma content of the beverage is however reciprocal, i.e. a high flow rate implies a beverage weak in aroma. Furthermore, not every user realises that a coarse grinding grade produces a beverage which is aromatically weak. Consequently, a processing device is preferably provided for the measurement data obtained from the flowmeter, which converts these measurement data into display data of a parameter, which can be more easily understood also by an inexperienced user. With the specification of the brewing pressure, a parameter is made available with which the user can more easily intuitively comprehend the actual relationships and thus, for example, associate a high brewing pressure (known from an espresso machine) with an aromatically strong beverage and furthermore associate that a high brewing pressure is produced by finely ground grounds. This conversion of the measurement data obtained on the flowmeter into display data of the brewing pressure is possible, because the brewing pressure is inversely proportional to the flow rate.

To increase safety, it is preferable to define limits up to which a user-specific setting is possible. This is particularly advisable for the highest value of the brewing pressure.

For the display device a visual display is suitable which is preferably formed as a bar indicator.

The grinding grade is preferably directly and manually set by the user, wherein a setting device for the grinding grade is provided.

A particularly preferred method of operating a coffee machine comprises the acquisition of the measurement data of a flow rate on the flowmeter, the conversion of the measurement data into display data of a brewing pressure, the display of the display data on a display device in a form identifiable by a user and the changing of a grinding grade setting on the grinding device.

BRIEF DESCRIPTION OF THE DRAWINGS

An embodiment of the disclosure is explained in more detail in the following based on the drawings. The following are shown.

DETAILED DESCRIPTION

Figure 1:
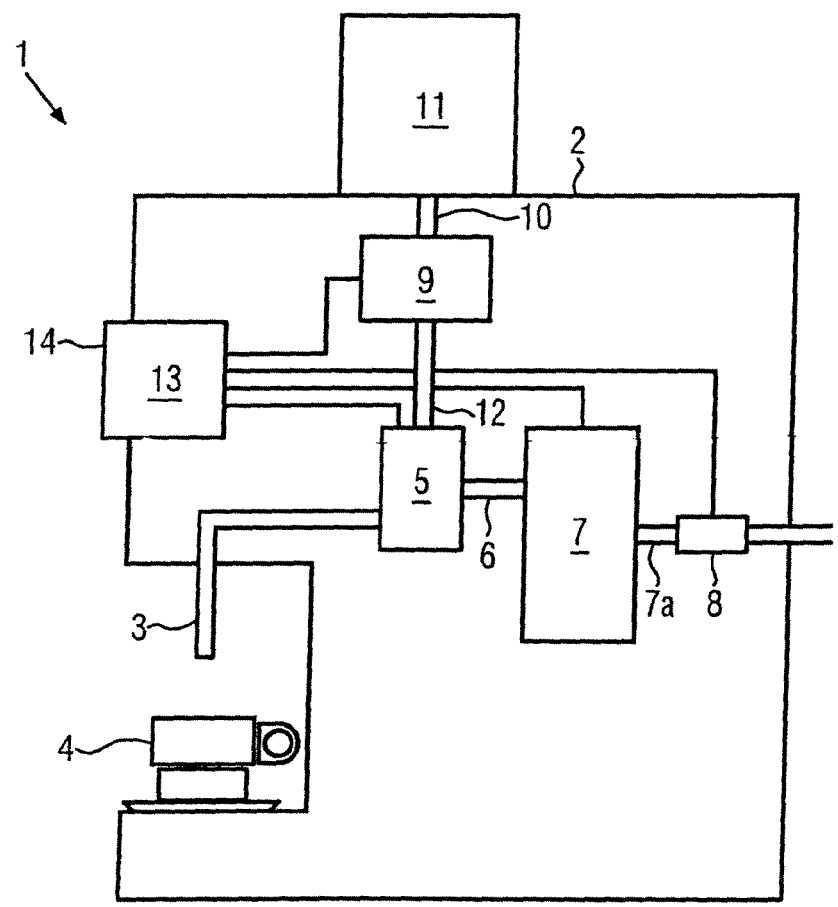
FIG. 1 a schematic illustration of a coffee machine equipped according to the disclosure, FIG. 2 part of a user interface, and FIG. 3 a graph of the relationship of the pressure on the brewer input, the pulses on the flowmeter and the grinding grade.
Figure 2:
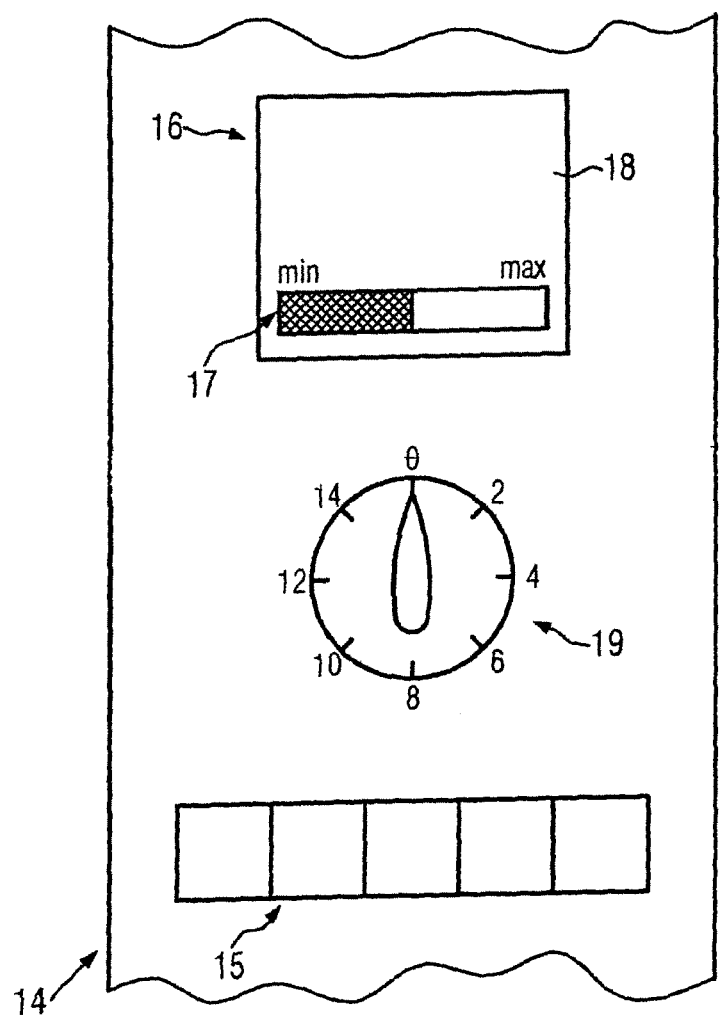

FIG. 1 illustrates in a strongly schematic form a coffee machine 1 according to the disclosure, in which only the components to be considered for the disclosure are illustrated. The coffee machine 1 includes a housing 2, from which a dispenser 3 is brought out, under which a collecting vessel 4 for a beverage—here a cup is shown—can be placed. The dispenser 3 is connected to a brewing device 5, which is of the conventional type of construction and for example can be a piston-type brewer. The brewing device 5 is supplied with hot brewing water via a hot-water pipe 6 from a hot-water source 7. The hot-water source 7 can for example be a hot-water boiler, a flow heater or any other internal or external hot-water supply device. In front of the brewing device 5 and before or after the hot-water source 7, a flowmeter 8 is arranged, which is preferably included in a cold-water feed pipe 7a to the hot-water source 7. The flowmeter measures the flow rate of the water flowing through it when the hot-water valve, which is not illustrated, is opened to initiate the brewing process.

Also connected to the brewing device 5 is a grinder 9 of a coffee grinding device, which is supplied with coffee beans via a feed chute 10 of a reservoir 11, which is preferably mounted outside on the housing 2 and introduces the grounds via a feed funnel 12 or similar device in portions into the brewing device 5.

Furthermore, the coffee machine 1 includes a controller 13, which is also connected to the brewing device 5, the hot-water source 7, the flowmeter 8 and the grinder 9 in order to prepare on request via an operating device 14 beverages, in particular coffee beverages, according to factory-specified or user-specified parameters.

The operating device 14 includes the usual preselection devices 15, with which the type of beverage and/or the quantity of beverage can be preselected. With the preselection device 15, for example, a single espresso, a double espresso, two espressi, a coffee-cream, a cup of filter coffee or similar beverage can be preselected.

The operating device 14 also includes a display device 16 with, for example, a display 18 or similar feature, which is used in the normal manner for communicating with the user and, for example, displays the preselection by the preselection device 15 (e.g. "One cup espresso"), servicing instructions (e.g. "Clean device") or operating statuses (e.g. "Preheating phase") or similar information. Furthermore, the display device 16 includes a display 17, for example in the form of a bar indicator, in which a conspicuous bar moves between a minimum value and a maximum value. The display 17 represents the flow rate on the flowmeter 8 and indicates the flow rate expressed as pressure in the brewing device 5.

The operating device 14 also includes a setting device 19 for setting the grinding grade on the grinder 9. In the illustrated embodiment the setting device 19 is formed as a rotary knob.

The various devices are only illustrated as examples for better identification as setting elements; it is obvious that the display and/or setting and/or preselection devices can also be part of the usual menu controls through which the user is guided.

The controller 13 operates the coffee machine 1 both according to factory-specified parameters as well as to user-specific modifiable parameters. The factory-specified parameters include, for example, the temperature of the brewing water, the amount of the brewing water and the amount of the grounds for a certain preselection and similar parameters. The grinding grade of the grounds can be set at the factory to a certain standard value for each preselection, but it can however be changed by the user.

In order to enable the user to set the grinding grade such that the desired result, i.e. a weaker or stronger coffee beverage is obtained, the flow rate of the brewing water is determined by the flowmeter 8 and is shown in the display 17. In doing this, the flow rate can be directly displayed, which is however confusing for the inexperienced user, because the flow rate and the desired aromatic strength of the beverage are reciprocal, i.e. an aromatically stronger beverage requires a lower flow rate. Preferably the control device 13 includes a device for processing the measurement data obtained by the flowmeter 8, which converts the measurement data to display data, preferably the brewing pressure. These display data are then rendered visible in the display 17, wherein for example a higher brewing pressure represents an aromatically strong beverage and a weak brewing pressure an aromatically weak beverage. Using the setting device 19, the user is able to change the grinding grade in the direction "coarse" or in the direction "fine" as required and thus shorten or extend the contact time between the grounds and the brewing water, which affects the strength, i.e. the extract content, of the finished beverage. The adjustment of the grinding grade then appears in the display 17, wherein for example with a finer setting for the grinding grade the bar in the display moves in the direction "max" and with a coarser set grinding grade it moves in the direction "min".

Figure 3:
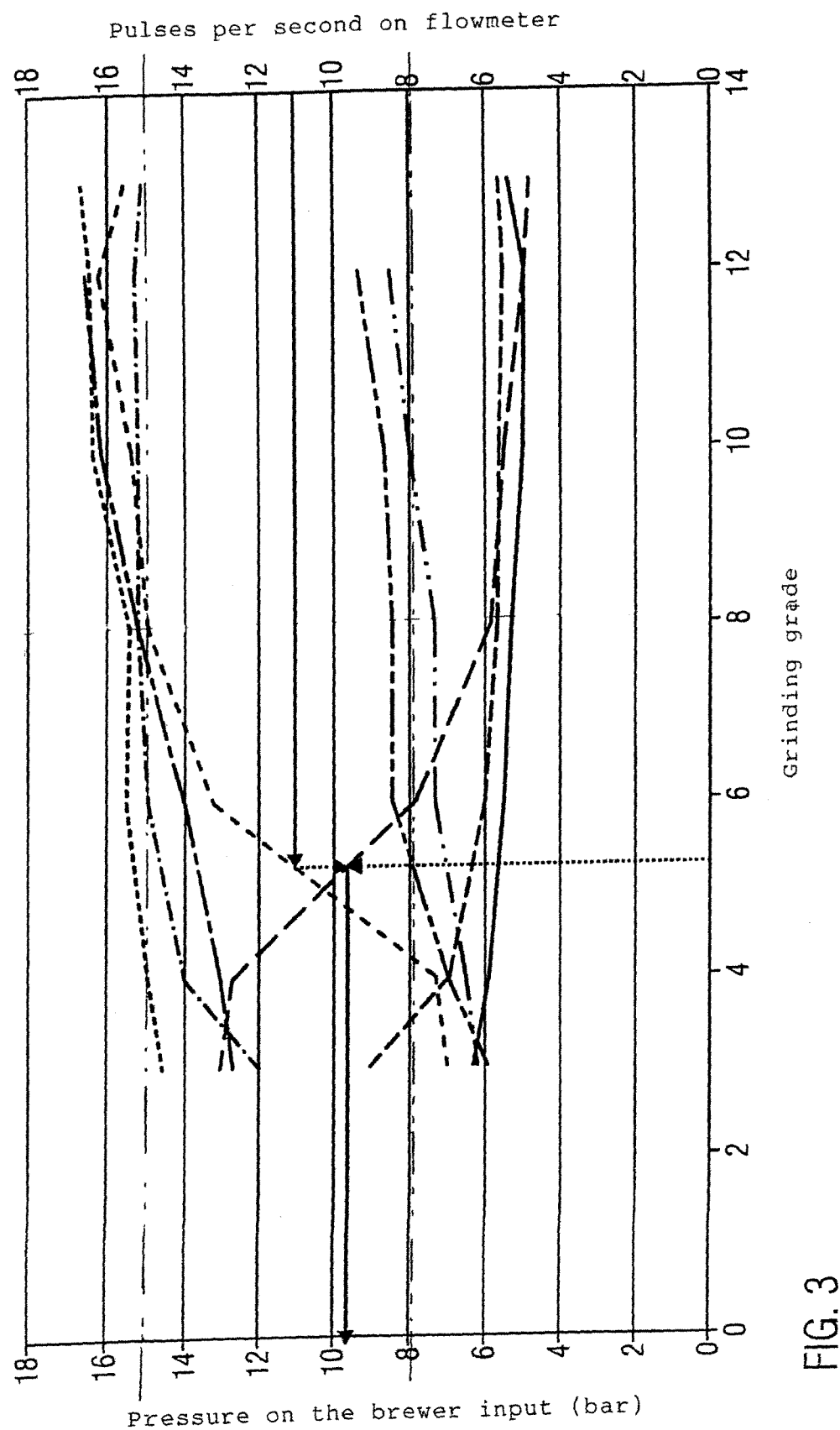

The conversion of the measurement data obtained by the flowmeter 8 into the display data of the brewing pressure is possible, because the brewing pressure and the flow rate are inversely proportional to one another, as illustrated in FIG. 3. FIG. 3 illustrates curves of the pressure, the pulses per second measured on the flowmeter and the amount of grounds for three different beverages according to the following legend, wherein the number of pulses represents a measure of the flow rate:

| | |
|---|---|
| ——————— | Pressure espresso |
| ——  ——  —— | Pressure 2 espresso strong |
| ——  ——  ——  ——  ——  —— | Pressure cream |
| - - - - - - - - - - - - - - - | Pulses espresso |
| —  ·  —  ·  —  ·  —  · | Pulses cream |
| —  · ·  —  · ·  —  · · | Amount of grounds 2 espresso (g) |
| ——  ——  —— | Amount of grounds espresso (g) |
| ——  ——  —— | Amount of grounds cream |
| — — — — — — — — | Pulses 2 espresso strong |

Apart from the user-specifically modifiable beverage quality (extract content), the display of the flow rate according to the disclosure can also be exploited for fault rectification and flow monitoring/pressure optimisation, as is explained in the following based on the preparation of an espresso:

Flow Monitoring/Pressure Optimisation, Espresso

From the graph in FIG. 3 it can be seen that the brewing pressure is approximately inversely proportional to the flow rate.

On account of this relationship a pressure in the brewer which is too high can be detected and prevented by monitoring the flow rate and thus an imminent blockage of the brewer can also be detected and prevented.

The control of the brewing pressure occurs for each brewed beverage via evaluation of the flow rate:

The evaluation "grinding grade too coarse" should only be displayed in the setting menu, not however during normal dispense of beverages (it could be that a customer would actually like an aromatically weak coffee).

t=0 sec to t=2.5 sec

Check of whether any flow pulses (FP in the following) are being counted.
　Yes=(Continue) brewing
　No=Cancellation, FP error
t=2.5 sec. to end of brewing
　If FP<8/s, then cancellation of brewing and display

| |
|---|
| Flow error! |
| Brewer |
| blocked? |
| Grounds too |
| fine? |

If FP<2/s, then cancellation of brewing and display

| |
|---|
| Flow error |

If FP<11/s, but ≥8/s, then brewing continues to end and indication in display:

| |
|---|
| Your choice, |
| please |
| Grounds too |
| fine? |

Settings Step "Set Grinding Grade"
In the settings menu select "Grinding grade setting":
　Carrying out a brewing with the recipe "2× espresso, strong aroma" to determine the current grinding grade/pressure setting.

The maximum level of the previous brewing process is displayed after the time t=2.5 s.
　The display of the maximum level is updated every 1 or 2 seconds.
Display:

| |
|---|
| Test brewing |
| Checking |
| grinding grade |

Start of the test brewing and display (display line 2 as in table):

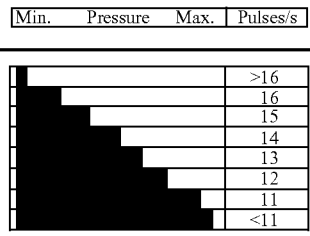

Definition of Level Display

Conversion of FP into level display: Min=16 FP/s, Max=11 FP/s→6 "pressure"=flow-rate classes to be displayed.

| Min. | Pressure | Max. | Pulses/s |
|---|---|---|---|
| | | | >16 |
| | | | 16 |
| | | | 15 |
| | | | 14 |
| | | | 13 |
| | | | 12 |
| | | | 11 |
| | | | <11 |

If <11 FP/s
Display:

| |
|---|
| Grounds too fine |

Hint that grinder should be opened up by 2 turns.
If >15 FP/s
Display:

| |
|---|
| Grounds to coarse |

Hint that grinder should be closed down by 1 turn.
If ≥11 FP/s and ≤15
Display:

| |
|---|
| Grounds OK |

As already mentioned above, the rotary knob as setting device for the grinding grade is only drawn for the purpose of better explanation. The setting device can for example also be included in a menu, which is formed such that with a change of the grinding grade also the display 17 changes simultaneously so that during the setting the user already receives an impression of how aromatically strong or weak in relationship the beverage to be prepared in the following brewing will be. As mentioned above, a limit is set leading to cancellation of the brewing, in particular when there is the risk that the brewing pressure will increase too strongly, because the grounds are ground too fine. In this embodiment a flow rate of less than 8 pulses/sec is defined as the limit.

As a modification of the described and drawn embodiment, the display of the flow rate can take place directly, i.e. not converted into the display of the brewing pressure. Instead of the brewing pressure also other display data, such as for example, taste or aroma levels can be produced. Instead of a bar indicator, the display data can also be visualized by other level or graphical displays. The disclosure can be used with all types of coffee machines and beverage machines in which the brewing water is automatically fed to the brewing device. Also, for example as is usual with semi-automatic machines of Italian design, the coffee grinding device need not be a constituent part of the coffee machine, but rather it can be a dedicated device with modifiable grinding grade. The flowmeter can be provided at any suitable point, for example, also in the hot-water pipe between the hot-water source and the brewing device.

The invention claimed is:

1. Method of operating a coffee machine comprising a grinding device, a brewing device, a brewing water source and a flowmeter, arranged before the brewing device, comprising the following:
   Acquiring flowrate data of a flow rate on the flowmeter;
   Converting the flowrate data obtained from the flowmeter into display data representative for a grind grade;
   Displaying the display data on a display device in a form identifiable by the user; and
   Providing a manually actuatable device to receive an input of a desired setting of the grind grade of the grinding device;
selecting a first one of a plurality of settings on the manually actuatable device.

2. Method of operating a coffee machine comprising a grinding device, a brewing device, a brewing water source, a flowmeter arranged before the brewing device, a manually actuatable device having a plurality of grinding settings, with each of the plurality of grinding settings corresponding to a unique grind grade of the grinding device, and a controller in communication with each of the grinding device, the brewing device, the brewing water source, the flowmeter, and the manually actuatable device, the method comprising:
   Receiving a first start input by the controller, the first start input being provided by a user to begin a first coffee preparation operation;
   Receiving a first grinding input by the controller from a first one of the plurality of grinding settings, wherein the first one of the plurality of grinding settings corresponds to a first grind grade, and wherein the first grinding input is provided by the user;
   Acquiring flowrate data by the controller of a flow rate on the flowmeter;
   Converting the flowrate data obtained from the flowmeter by the controller into display data representative for a grind grade;
   Displaying the display data on a display device in a form identifiable by the user;
   Receiving a first stop input by the controller that cancels the first coffee preparation operation, the first stop input provided by one of the controller or the user, wherein the user provides the first stop input based on the display data displayed on the display device or the controller provides the first stop input based on the flowrate data; and
   Receiving a second grinding input by the controller from a second one of the plurality of grinding settings, the second one of the plurality of grinding settings corresponding to a second grind grade that is different than the first grind grade, wherein the second grinding input is provided by the user.

3. Method of operating the coffee machine of claim 2, further comprising:
   Receiving a second start input by the controller, the second start input being provided by a user to begin a second coffee preparation operation.

* * * * *